United States Patent [19]

MacDonald

[11] Patent Number: 5,354,903

[45] Date of Patent: Oct. 11, 1994

[54] POLYMERS PREPARED FROM CONCENTRATED SOLUTIONS OF N',N'METHYLENEBISACRYLAMIDE

[75] Inventor: Russell J. MacDonald, Wilmington, Mass.

[73] Assignee: Ionics, Incorporated, Watertown, Mass.

[21] Appl. No.: 996,742

[22] Filed: Dec. 24, 1992

Related U.S. Application Data

[60] Continuation-in-part of Ser. No. 705,872, May 28, 1991, abandoned, which is a division of Ser. No. 541,854, Jun. 21, 1990, Pat. No. 5,037,858.

[51] Int. Cl.$^5$ .......................................... C07C 233/38
[52] U.S. Cl. .......................................... 564/4; 521/38; 564/204; 564/206
[58] Field of Search ...................... 521/38; 564/4, 204, 564/206

[56] References Cited

U.S. PATENT DOCUMENTS

| | | | |
|---|---|---|---|
| 4,074,039 | 2/1978 | Lim et al. | 526/303 |
| 4,107,057 | 8/1978 | Dill et al. | 252/8.55 |

*Primary Examiner*—Richard L. Raymond
*Attorney, Agent, or Firm*—Norman E. Saliba

[57] ABSTRACT

This invention is directed to producing highly concentrated solutions of methylenebisacrylamide and thereafter blending with ionogenous acrylic monomers to produce low porosity, highly crosslinked, water insoluble polymers.

8 Claims, No Drawings

POLYMERS PREPARED FROM CONCENTRATED SOLUTIONS OF N',N'METHYLENEBISACRYLAMIDE

This application is a continuation-in-part of copending Application Ser. No. 07/705,872, now abandoned, which is a division of Application Ser. No. 07/541,854 (U.S. Pat. No. 5,037,858).

BACKGROUND OF THE INVENTION

1. Field of the Invention

This invention is directed to producing highly concentrated solutions of the bifunctional monomer methylenebisacrylamide ($CH_2$=$CHCONH)_2CH_2$, and thereafter for example blending them with ionogenous acrylic monomers to produce homogeneous solutions which are polymerized to produce low porosity, highly crosslinked, water insoluble polymers for use as anion selective resins and membranes.

2. Description of the Prior Art

The usual technique for the production of anion selective polymers similar to those described in the invention involves co-polymerizing methacrylate esters containing amine groups of the tertiary type, with cross-linking methacrylate esters (U.S. Pat. No. 4,231,855 Hodgdon et. al.). The resulting polymer with pendant tertiary amine groups is further reacted so that the tertiary amine groups are converted to quaternary ammonium salts producing an anion selective membrane structure. This prior art has disadvantages in that the polymerization reaction is carried out in non-water soluble organic solvents that have to be washed out with a water soluble alcohol (such as methanol) before the polymer membrane sheet can be subjected to quaternization to the ammonium salt. A further disadvantage of the prior art is the use of acrylate esters which degrade rapidly in the presence of caustic substances such as sodium hydroxide solutions. The present invention comprises an improvement over methods of the prior art by using water soluble polar solvents and monomers possessing acrylamide groups, (which are only slightly sensitive to caustic solutions) thus replacing the use of acrylate ester groups. Further, the present invention comprises a method to obtain concentrated solutions of methylenebisacrylamide (MBA) in water soluble, polar solvents using caustic as a solubilizing agent. Prior art methods utilizing methylenebisacrylamide are generally limited by the poor solubility of methylenebisacrylamide in the commonly employed solvents.

SUMMARY OF THE INVENTION

The invention comprises preparing highly concentrated solutions of the cross-linker methylenebisacrylamide (MBA) in water soluble polar solvents, then for Example blending water soluble functional acrylic monomers into the solution, resulting in a homogeneous solution capable of being polymerized into anion-selective polymer.

The solubility of methylenebisacrylamide in various water soluble, polar solvents as listed in Table I below, was taken from the manufacturer's brochure, (Bulletin PRC-47 American Cyanamid Co.)

TABLE I

| Solvent | MBA "Solubility" g./100 ml. of Solvent | Temperature, °C. |
| --- | --- | --- |
| Water | 2 | 10 |
| " | 3 | 25 |
| " | 6.5 | 50 |
| " | 13 | 70 |
| Acetone | 1.0 | 30 |
| Butyl cellosolve | 2.5 | 30 |
| Dioxane | 1.1 | 30 |
| Ethanol | 5.4 | 30 |
| Methanol | 8.2 | 30 |

As noted in the Table, the levels of solubility are not sufficient to produce an ion-selective polymer of desired properties i.e. ion-exchange capacity and % water content (porosity) suitable for use as ion-selective resins and membranes. It was however surprisingly found that the addition of small amounts of caustic (such as a sodium hydroxide solution) to a heated slurry of solid and partially dissolved methylenebisacrylamide, causes the solution to become homogeneous which solution, upon cooling to room temperature, remains homogeneous. This is a novel and totally unexpected result since caustic is known to hydrolyze amide compounds. However, apparently the use of only modest amounts of caustic and the subsequent modest degree of hydrolysis of the methylenebisacrylamide aids somehow in dissolving the remainder of the unhydrolyzed methylenebisacrylamide into the solvent system.

The caustic may break up the hydrogen bonding normally present in the MBA solid and allow the MBA to dissolve. The caustic also may cause some of the MBA to hydrolyze into fragments as shown below which also eventually polymerize:

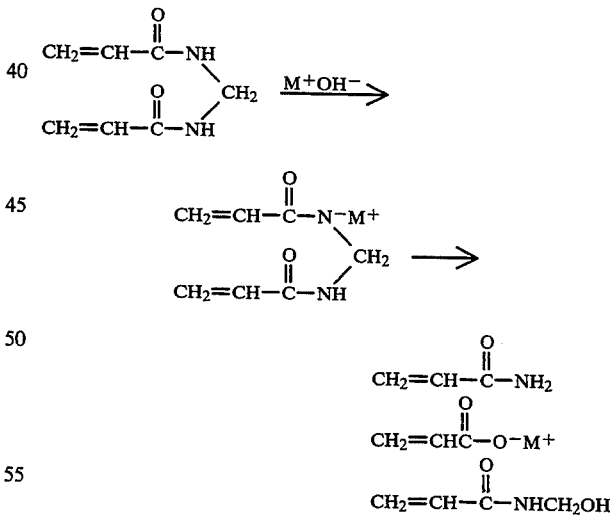

Table II shows the actual solubilities of methylenebisacrylamide in certain solvent systems at 23° C. with and without added caustic. Preferred solvents for use in the present invention include dimethylformamide (DMF) and N-methyl pyrrolidone (NMP).

By blending ionogenous monomers with the concentrated solution of methylenebisacrylamide resulting from caustic addition, one obtains (after polymerization and appropriate work-up) polymers which contain porosity levels and crosslink densities highly suitable for ion-selective polymers.

TABLE II

| Solvent System | System Composition Vol/Vol | MBA "Solubility" g./100 ml. of Solvent System |
|---|---|---|
| DMF | 100 | 12.5 |
| DMF/H$_2$O | 90/10 | 14.3 |
| DMF/1.0N NaOH | 90/10 | >100 |
| NMP | 100 | 16 |
| NMP/H$_2$O | 90/10 | 18 |
| NMP/1.0N NaOH | 90/10 | 75 |

To prepare the concentrated methylenebisacrylamide (MBA) solution, a water soluble, polar solvent such as N-methylpyrrolidone (NMP) is heated with the MBA as a slurry preferably to at least 70° C. but no higher than about 110° C. To the solid slurry is added up to a maximum of 7 mole % of a 10N sodium hydroxide solution relative to the MBA. A clear, homogeneous solution is obtained which can be blended with an acrylic ionomer such as methacrylamidopropyltrimethylammonium chloride (MAPTAC) and cooled to room temperature or first cooled to room temperature and then blended with MAPTAC.

A suitable ionogenous acrylic monomer for use in the present invention is selected from the following:

$$CH_2=\overset{R}{\underset{|}{C}}-\overset{O}{\underset{||}{C}}-NH-R_1-\overset{+}{N}R_2R_3R_4 X^-$$

where:
R = H, CH$_3$;
R$_1$ = C$_1$-C$_{22}$;
R$_2$, R$_3$, R$_4$ = H, CH$_3$, alkyl containing C$_2$-C$_{22}$, benzyl, phenyl; and
X$^-$ = Cl$^-$, Br$^-$, ½ SO$_4$$^=$, NO$_3$$^-$.

The acrylic monomers should comprise between about 25 to 75 mole % based on the total amount of reactant monomers. The preferred ionogenous acrylic monomers for purposes of this invention include methacrylamidopropyltrimethylammcnium chloride (MAPTAC).

The formula for MAPTAC is as follows:

$$\left[ CH_2=\overset{CH_3}{\underset{|}{C}}-\overset{O}{\underset{||}{C}}-NH-CH_2-CH_2-CH_2-\overset{CH_3}{\underset{\underset{CH_3}{|}}{\overset{|}{N}}}-CH_3 \right] Cl^\ominus$$

The acrylic monomer may also be selected from the following:

$$CH_2=\overset{R}{\underset{|}{C}}-\overset{O}{\underset{||}{C}}NH-R_1-NR_2R_3$$

In this latter case the resulting polymer would be post-reacted with an alkylating agent (such as methyl chloride CH$_3$Cl) to form the anion-selective polymer. The preferred monomer in this latter case is dimethylaminopropylmethacrylamide. (DMAPMA)

Suitable water soluble, polar compounds which can be advantageously employed as non-polymerizable (NP) solvents or diluents are especially the amides such as dimethylformamide (DMF), N-methyl pyrrolidone (NMP), 2-pyrrolidone, dimethylacetamide (DMAC), formamide, etc. straight chain alcohols, polyether alcohols, ketones and the like. The volume of water soluble solvent present during polymerization determines the percent porosity and substantially fixes the solvent or water holding capacity or content of the resulting polymer. The solvent or NP employed is typically 20–50% by volume of the final liquid formulation but may be more or less if so desired.

A suitable class of water soluble, free-radical generating compounds which can be used as catalysts for polymerization are both the peroxides and the azo catalysts. The water soluble azo catalysts include for example, 2,2'-azobis(2-amidinopropane)dihydro-chloride (known under the trademark V-50) and 2,2'-azobis(N,N'-dimethyleneisobutyramidine)dihydrochloride. The water soluble peroxide catalysts include 2,4-pentanedione peroxide, hydrogen peroxide, potassium persulfate and the like. These compounds which serve as free radical initiators, contain an —N=N— group (azo) or —O—O— group (peroxide) attached to aliphatic carbon atoms, at least one of which is tertiary. An amount of 0.01% to 2% of the weight of monomer is usually sufficient.

The anion polymer of the present invention may be synthesized using a wide ratio range of the ionogenous acrylic monomer to the crosslinking monomer (such as methylenebisacrylamide) but it is preferred that the starting liquid mix comprise anywhere from 0.3 to 0.7 moles of the ionogenous monomer (preferably 0.5–0.6 moles) to each mole of the cross-linking monomer. The cross-linking monomers that may be employed in the present invention are the alkylenebisacrylamides or alkylenebismethacrylamides which have two or more acryloyl and/or methacryloyl functional groups; the most preferred being methylenebisacrylamide.

The polymerization reaction may be carried out in the temperature range of about 40° C.–100° C. but the preferred range is between about 60°C.–80° C.

The preferred procedure for preparing the copolymers of this invention is further illustrated by the following examples:

EXAMPLE 1

To 5.8 L of NMP (GAF Chemical Co.) was added 20 lbs. of MBA(American Cyanamid Co.) with stirring and heating to 80° C. 0.4 L of 10N sodium hydroxide solution was carefully added and heating and stirring was continued until a homogeneous solution was obtained. To the hot solution was added 26 L of a 50% MAPTAC solution (Rohm Tech. Inc.). The resulting solution was then cooled to 30° C. 500 g of Vazo 67 (E. I. dupont Co.) 2,2'-azobis(isovaleronitrile) was added to the resulting solution which mixture was stirred until homogeneous. The thus resulting monomer solution was then poured into an 11"×13"×2" deep rectangular tray into which was laid in alternating fashion, glass plates and 20 mil thick modacrylic cloth until the top of the monomer liquid level was reached. The entire tray was put into an oven at 80° C. and heated for 2 hours. At the end of this period, the entire liquid monomer had turned to a solid mass. The excess resin was chipped from the pan and the glass was removed to yield cloth sheets, 20 mils in thickness surrounded and impregated with polymerized resin. The resulting membranes were placed in an aqueous sodium chloride solution and later analyzed to give the following properties:

Mullen Burst = 140 psi
Thickness = 0.054 cm.
Resistivity = 9.0 ohm-cm$^2$. (0.01N NaCl) (1000 Hz)

Water Content=45.6%
Capacity=2.4 Milliequivalents per gram of dry resin

EXAMPLE 2

To 5.8 L of NMP was added 20 lbs. of MBA with stirring and heating to 80° C. 0.4 L of 10N sodium hydroxide solution was added and heating and stirring was continued until a homogeneous solution was obtained. The solution was then cooled to 30° C. and to this solution was added 10 L of dimethylaminopropyl methacrylamide (DMAPMA), (Rohm Tech. Inc.), 13 L of water and 500 g of Vazo 67. The resulting mixture was stirred until homogeneous. The resulting solution was then poured into a deep rectangular tray and polymerized as in Example 1. The resulting membrane (20 mils thick) were post alkylated by placing in a solution of methyl chloride ($CH_3Cl$) and NMP overnight, then in an aqueous sodium chloride solution and later analyzed to give the following properties:
Mullen Burst=150 psi
Thickness=0.054 cm.
Resistivity=9.7 ohm-$cm^2$. (0.01N NaCl) (1000 Hz)
water Content=46.8%
Capacity=2.2 Milliequivalents per gram of dry resin While the novel anion selective membranes of this invention can be used especially in connection with electrodialysis and electrolytic systems utilizing alternating anion-exchange membranes and cation exchange membranes, it will be appreciated that the membranes of this invention are equally useful in other types of systems. For example, systems are known which utilize only anion-exchange membranes, or neutral(non-permselective) membranes in combination with anion exchange membranes. Such systems, as known in the art, are useful, for example, in double decomposition chemical reactions. The novel anion membranes are also useful in systems involving a plurality of anion- and cation-exchange membranes wherein the said membranes are not present in equal quantities, i.e., where there are more anion-exchange membranes than cation-exchange membranes, or vice versa.

Accordingly, since certain changes may be made without departing from the scope of the invention herein involved, it is intended that all matter contained in the above description shall be interpreted as illustrative and not in a limiting sense.

I claim:

1. A process for solubilizing a slurry of one or more bisamide compounds selected from the group consisting of alkylenebisacrylamides and alkylenebismethacrylamides suspended in a liquid which liquid comprises at least one water miscible organic compound and a minor amount of water by weight, said process comprising adding at least one caustic in an amount greater than 0.01 gram-equivalents per liter of said slurry and effective to cause the substantial solubilization of said slurry, said slurry characterized by having a concentration of at least one of said bisamide compounds in dissolved and suspended state which concentration is greater than the equilibrium solubility of said one bisamide compound in said liquid at the temperature of said slurry, said water present in said slurry in an amount of at least one mole for each three moles of said at least one bisamide compound.

2. The process of claim 1 wherein the said slurry contains a concentration of said one or more bisamide compounds between about 75 to 100 grams per 100 ml of solvent system.

3. The process of claim 1 wherein said at least one caustic is sodium hydroxide and is added to said slurry up to about 7 mole % relative to the concentration of said one or more bisamide compounds.

4. The process of claim 1 wherein said at least one water miscible organic compound is selected from the group consisting of dimethyl formamide, N-methyl-pyrrolidone, formamide, dimethylacetamide, and 2-pyrrolidone.

5. A substantially completely homogeneous solution which is the product of a slurry in a liquid of one or more suspended bisamide compounds selected from the group consisting of alkylenebisacrylamides and alkylenebismethacrylamides, said slurry characterized by having a concentration of at least one of said bisamide compounds in dissolved and suspended state, which concentration is substantially greater than the equilibrium solubility of said one compound in said liquid at the temperature of said slurry, said liquid also comprising water in an amount of at least about one mole for each three moles of said at least one of said bisamide compounds and at least one caustic present in an amount greater than 0.01 gram equivalents per liter of said slurry.

6. An essentially homogenous solution which is the product of a slurry in a liquid of one or more suspended bisamide compounds selected from the group consisting of alkylenebisacrylamides and alkylenebismethacrylamides and of up to about 7 mole percent of at least one caustic relative to the moles of said bisamide compound in suspended and dissolved state in said liquid said slurry having a concentration of at least one said bisamide compounds in dissolved and suspended state in said liquid which concentration is substantially greater than the equilibrium solubility of said one bisamide compound in said liquid, said slurry also having at least about one mole of water for each three moles of said one or more bisamide compounds.

7. An essentially homogenous solution in a liquid, the said solution comprising a bisamide compound selected from the group consisting of alkylenebisacrylamides and alkylene bismethacrylamides, said solution having an available concentration of said bisamide compound in the dissolved state of at least about 75 grams per 100 ml of liquid.

8. A liquid comprising:
a) a solubilized amide selected from the group consisting of compounds having the formula:

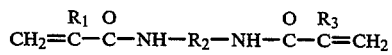

where $R_1$ and $R_3$ are independently selected from the group consisting of H and alkyl groups and $R_2$ is an alkylene group;
b) a solvent comprising at least about one mol of water for each three moles of said amide and
c) at least 0.01 gram-equivalents of an alkali per liter of said liquid;
said liquid further characterized by having a concentration of said solubilized amide which is substantially greater than the saturation concentration of said amide in said solvent in the substantial absence of said alkali and at the temperature of said liquid.

* * * * *